United States Patent
Song et al.

(10) Patent No.: US 9,657,980 B2
(45) Date of Patent: May 23, 2017

(54) MOTOR DRIVING APPARATUS AND REFRIGERATOR INCLUDING SAME

(71) Applicant: LG ELECTRONICS INC., Seoul (KR)

(72) Inventors: Hyun Sook Song, Seoul (KR); Ho Hyun Son, Seoul (KR); Myung Keun Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/783,272

(22) PCT Filed: Apr. 11, 2013

(86) PCT No.: PCT/KR2013/003028
§ 371 (c)(1),
(2) Date: Oct. 8, 2015

(87) PCT Pub. No.: WO2014/168267
PCT Pub. Date: Oct. 16, 2014

(65) Prior Publication Data
US 2016/0061506 A1    Mar. 3, 2016

(51) Int. Cl.
*H02P 23/14*    (2006.01)
*F25B 49/02*    (2006.01)
(Continued)

(52) U.S. Cl.
CPC ............ *F25B 49/025* (2013.01); *F25B 39/02* (2013.01); *H02P 1/04* (2013.01); *H02P 6/18* (2013.01);
(Continued)

(58) Field of Classification Search
CPC .................................................... H02P 23/14
(Continued)

(56) References Cited

U.S. PATENT DOCUMENTS

| 4,825,132 A | 4/1989 | Gritter |
| 6,216,478 B1* | 4/2001 | Kang .................. F25D 29/00 62/228.4 |

(Continued)

FOREIGN PATENT DOCUMENTS

| EP | 0 823 775 | 2/1998 |
| EP | 0 945 974 A2 | 9/1999 |

(Continued)

OTHER PUBLICATIONS

International Search Report issued in Application No. PCT/KR2013/003028 dated Dec. 26, 2013.
European Search Report dated Nov. 14, 2016 issued in Application No. 13881514.7.

*Primary Examiner* — David S Luo
(74) *Attorney, Agent, or Firm* — KED & Associates, LLP

(57) ABSTRACT

The present invention relates to a motor driving apparatus and a refrigerator including the same. A motor driving apparatus according to an embodiment of the present invention comprises: a signal delay unit for delaying an input speed order signal; an inverter control unit for outputting an inverter switching control signal, on the basis of the speed order signal delayed by the signal delay unit; and an inverter for converting an input operation direct current power into a predetermined alternating current power, on the basis of a switching operation according to the inverter switching control signal, and driving a motor using the converted alternating current power. Therefore, it is possible to prevent starting failure and reduce noise.

16 Claims, 10 Drawing Sheets

(51) Int. Cl.
*H02P 6/18* (2016.01)
*F25B 39/02* (2006.01)
*H02P 1/04* (2006.01)

(52) U.S. Cl.
CPC ........ *H02P 23/14* (2013.01); *F25B 2600/021* (2013.01); *F25B 2600/112* (2013.01); *F25B 2600/23* (2013.01); *H02P 2203/09* (2013.01); *Y02B 30/741* (2013.01)

(58) Field of Classification Search
USPC .................. 318/811, 810, 807, 767, 727
See application file for complete search history.

(56) References Cited

U.S. PATENT DOCUMENTS

| | | | |
|---|---|---|---|
| 6,931,872 B2 * | 8/2005 | Kaga .................... | F25B 49/025 62/215 |
| 7,334,648 B2 * | 2/2008 | Arimura ................. | B25B 21/02 173/176 |
| 8,179,069 B2 * | 5/2012 | Matsunaga .............. | B25F 5/00 318/430 |
| 2008/0272724 A1 | 11/2008 | Hayashi | |
| 2012/0104981 A1 | 5/2012 | Tseng et al. | |

FOREIGN PATENT DOCUMENTS

| | | |
|---|---|---|
| EP | 2 051 087 | 4/2009 |
| JP | H08-172789 A | 7/1996 |
| JP | 2009-278725 A | 11/2009 |
| KR | 2000-0074987 A | 12/2000 |

\* cited by examiner (a)

(b)

MOTOR DRIVING APPARATUS AND REFRIGERATOR INCLUDING SAME

CROSS-REFERENCE TO RELATED PATENT APPLICATIONS

This application is a U.S. National Stage Application under 35 U.S.C. §371 of PCT Application No. PCT/KR2013/003028, filed Apr. 11, 2013, whose entire disclosure is hereby incorporated by reference.

TECHNICAL FIELD

The present invention relates to a motor driving apparatus and a refrigerator including the same and, more particularly, to a motor driving apparatus and a refrigerator including the same, which are capable of preventing start-up failure and reducing noise.

BACKGROUND ART

Generally, refrigerators serve to keep food fresh for a long period. Such a refrigerator includes a freezing compartment in which food is kept frozen, a refrigerating compartment in which food is kept refrigerated, and a refrigeration cycle for coding of the freezing compartment and the refrigerating compartment. Operation of the refrigerator is controlled by a controller equipped in the refrigerator.

A kitchen space containing a refrigerator is not simply a space for cooking, but is changed to a more important living space than ever before for conversation between family members as well as cooking and other purposes. Therefore, there is a need to enlarge a refrigerator that is a core component of the kitchen space and to achieve quantitative and qualitative functional change for easy use by all family members.

DISCLOSURE

Technical Problem

An object of the present invention devised to solve the problem lies in a motor driving apparatus and a refrigerator including the same, which are capable of preventing start-up failure and reducing noise.

Technical Solution

The object of the present invention can be achieved by providing motor driving apparatus including a signal delay unit configured to delay an input speed command signal, an inverter controller configured to output an inverter switching control signal based on the speed command signal delayed by the signal delay unit, and an inverter configured to convert an input operating direct current (DC) voltage into a predetermined alternating current (AC) voltage and driving a motor by the converted AC voltage, based on switching operation according to the inverter switching control signal.

In another aspect of the present invention, provided herein is a refrigerator including a compressor, an evaporator configured to perform heat exchange using a refrigerant compressed by the compressor, a fan configured to deliver air subjected to heat exchange by the evaporator into the refrigerator, and a fan drive unit configured to drive the fan, wherein the fan drive unit includes a signal delay unit configured to delay an input speed command signal, an inverter controller configured to output an inverter switching control signal based on the speed command signal delayed by the signal delay unit, and an inverter configured to convert an input operating direct current (DC) voltage into a predetermined alternating current (AC) voltage and driving a motor by the converted AC voltage, based on switching operation according to the inverter switching control signal.

Advantageous Effects

According to the embodiments of the present invention, a motor driving apparatus and a refrigerator including the same include a signal delay unit configured to delay an input speed command signal and output an inverter switching control signal based on the speed command signal delayed by the signal delay unit, thereby preventing start-up failure and reducing noise upon initial start-up of the motor.

In particular, in an initial start-up period in which operating direct current (DC) voltage input to the inverter sequentially increases, the inverter is not switched due to malfunction, such that a ringing period in which phase current flowing in the motor rings does not occur. Accordingly, it is possible to stably drive the motor.

Meanwhile, even when noise is added to the operating DC voltage input to the inverter, the inverter is not switched due to malfunction, such that a ringing period in which phase current flowing in the motor rings does not occur. Accordingly, it is possible to stably drive the motor.

BEST MODE

Hereinafter, the present invention will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
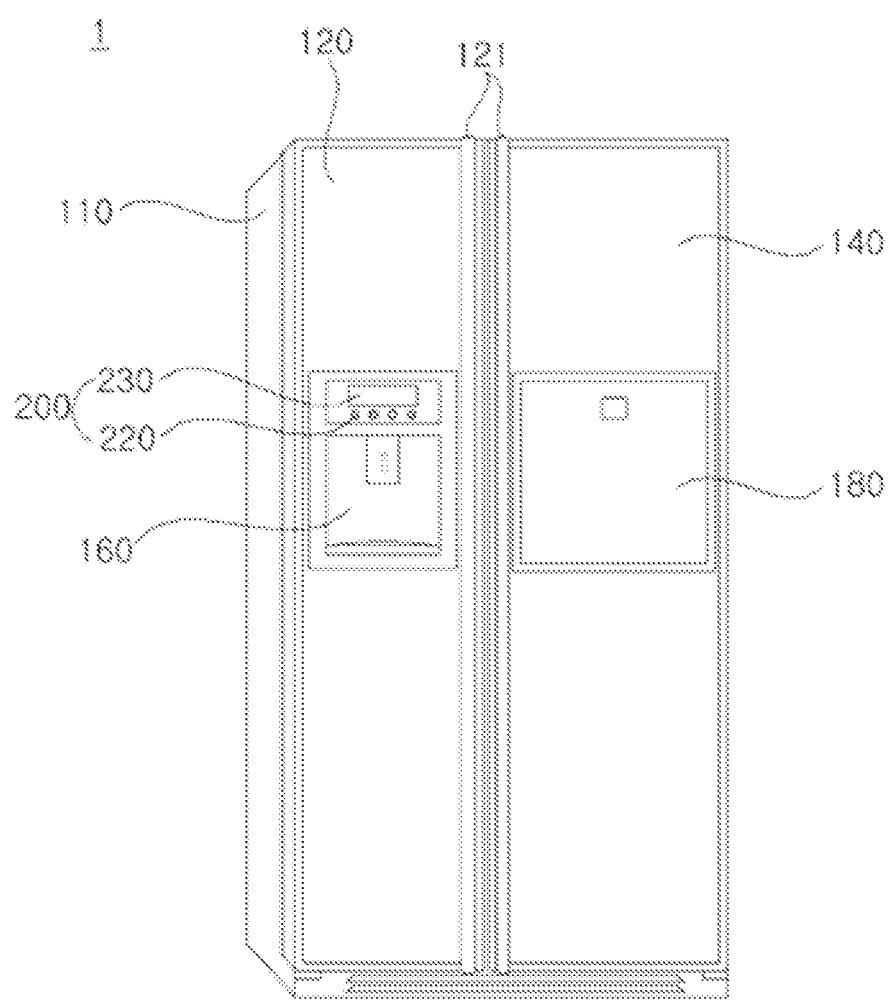
FIG. 1 is a perspective view showing a refrigerator according to an embodiment of the present invention.

FIG. 1 is a perspective view showing a refrigerator according to an embodiment of the present invention.

With reference to the drawing, the refrigerator 1 related to the present invention includes a case 110, which has an inner space divided into a freezing compartment and a refrigerating compartment (not shown in the drawing), a freezing compartment door 120 to shield the freezing compartment, and a refrigerating compartment door 140 to shield the refrigerating compartment, the case 110 and the doors 120 and 140 defining an outer appearance of the refrigerator 1.

The freezing compartment door 120 and the refrigerating compartment door 140 may be provided at front surfaces thereof with forwardly protruding door handles 121 to assist a user in easily pivoting the freezing compartment door 120 and the refrigerating compartment door 140 by gripping the door handles 121.

The refrigerating compartment door 140 may further be provided at a front surface thereof with a so-called home bar 180 that allows the user to conveniently retrieve stored items, such as beverages, without opening the refrigerating compartment door 140.

The freezing compartment door 120 may further be provided at a front surface thereof with a dispenser 160 that allows the user to easily and conveniently retrieve ice or drinking water without opening the freezing compartment door 120. The freezing compartment door 120 may further be provided with a control panel 210 at the upper side of the dispenser 160. The control panel 210 serves to control driving operation of the refrigerator 1 and to display a screen showing a current operating state of the refrigerator 1.

The control panel 210 may include an input unit 220 having a plurality of buttons and a display 230 to display control screens, operating states, and the like.

The display 230 displays control screens, operating states, and other information, such as an internal temperature of the refrigerator, etc. For example, the display 230 may display a service type of the dispenser 160 (ice cubes, water, crushed ice), a set temperature of the freezing compartment, and a set temperature of the refrigerating compartment.

The display 230 may be any one of a liquid crystal display (LCD), light emitting diode (LED), and organic light emitting diode (OLED) units and the like. In addition, the display 230 may be a touchscreen that may additionally perform a function of the input unit 220.

The input unit 220 may include a plurality of operation buttons. For example, the input unit 220 may include a dispenser setting button (not shown) to set a service type of the dispenser (ice cubes, water, crushed ice), a freezing compartment temperature setting button (not shown) to set a temperature of the freezing compartment, and a refrigerating compartment temperature setting button (not shown) to set a temperature of the refrigerating compartment. In addition, the input unit 220 may be a touchscreen that may additionally perform a function of the display 230.

The refrigerator according to embodiments of the present invention is not limited to a double door type shown in the drawing, and may be any one of a one door type refrigerator, a sliding door type refrigerator, a curtain door type refrigerator and others, if a compressor and fan for the freezing cycle or the refrigeration cycle of the refrigerator is included.

Figure 2:
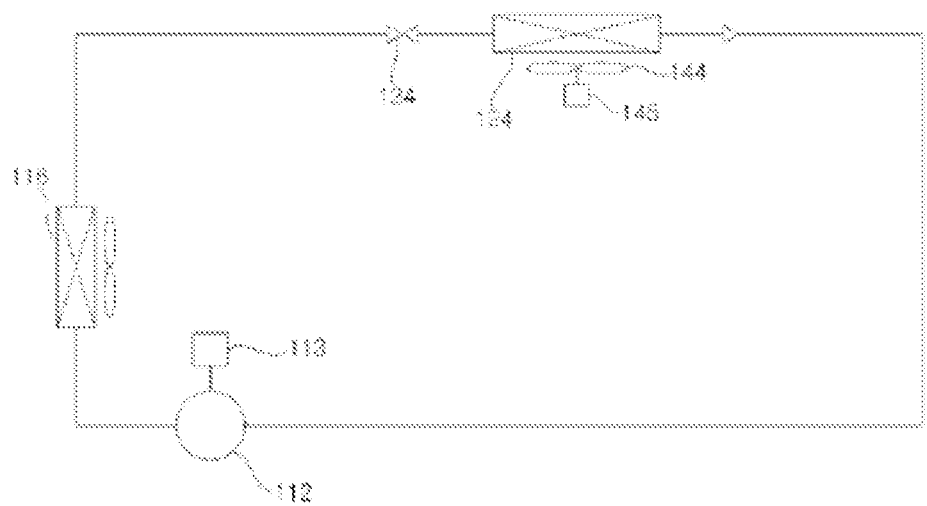
FIG. 2 is a diagram schematically showing the configuration of the refrigerator of FIG. 1.

FIG. 2 is a diagram schematically showing the configuration of the refrigerator of FIG. 1.

With reference to the drawing, the refrigerator 1 may include a compressor 112, a condenser 116 to condense refrigerant compressed in the compressor 112, a freezing compartment evaporator 124 placed in the freezing compartment (not shown) to evaporate the condensed refrigerant directed from the condenser 116, and a freezing compartment expansion valve 134 to expand the refrigerant to be directed to the freezing compartment evaporator 124.

While the drawing shows use of a single evaporator by way of example, evaporators may be respectively placed in the freezing compartment and the refrigerating compartment.

That is, the refrigerator 1 may further include a refrigerating compartment evaporator (not shown) placed in the refrigerating compartment (not shown), a 3-way valve (not shown) to direct the condensed refrigerant from the condenser 116 to the refrigerating compartment evaporator (not shown) or the freezing compartment evaporator 124, and a refrigerating compartment expansion valve (not shown) to expand the refrigerant to be directed to the refrigerating compartment evaporator (not shown).

In addition, the refrigerator 1 may further include a gas-liquid separator (not shown) in which the refrigerant having passed through the freezing compartment evaporator 124 is divided into liquid and gas.

The refrigerator 1 may further include a refrigerating compartment fan (not shown) and a freezing compartment fan 144, which suction cold air having passed through the freezing compartment evaporator 124 and blow the cold air to the refrigerating compartment (not shown) and the freezing compartment (not shown) respectively.

The refrigerator 1 may further include a compressor drive unit 113 to drive the compressor 112, a refrigerating compartment fan drive unit (not shown) to drive the refrigerating compartment fan (not shown), and a freezing compartment fan drive unit 145 to drive the freezing compartment fan 144.

Meanwhile, in the case in which the common evaporator 124 is used in the freezing compartment and the refrigerating compartment as shown in the drawing, a damper (not shown) may be installed between the freezing compartment and the refrigerating compartment, and a fan (not shown) may forcibly blow cold air generated by the single evaporator to the freezing compartment and the refrigerating compartment.

Figure 3:
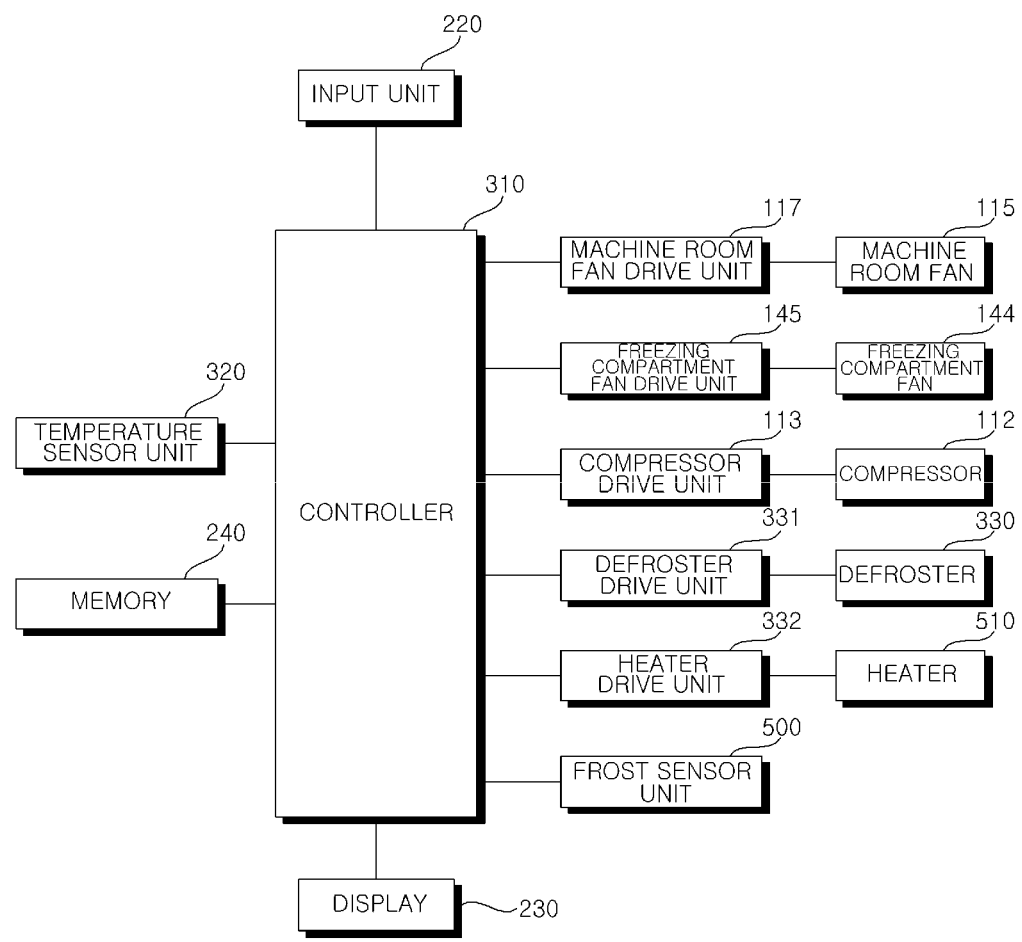
FIG. 3 is a block diagram schematically showing the internal configuration of the refrigerator of FIG. 1.

FIG. 3 is a block diagram schematically showing the internal configuration of the refrigerator of FIG. 1.

With reference to the drawing, the refrigerator of FIG. 3 may include the compressor 112, a machine room fan 115, the freezing compartment fan 144, a controller 310, a defroster 330, a heater 510, a frost sensor unit 500, a temperature sensor unit 320, and a memory 240. In addition, the refrigerator may further include the compressor drive unit 113, a machine room fan drive unit 117, the freezing compartment fan drive unit 145, a defroster drive unit 331, a heater drive unit 332, the display 230, and the input unit 220.

For a description related to the compressor 112 and the freezing compartment fan 144, refer to FIG. 2.

The input unit 220 includes a plurality of operation buttons and transmits a signal related to an input freezing compartment set temperature or an input refrigerating compartment set temperature to the controller 310.

The temperature sensor unit 320 senses an internal temperature of the refrigerator and transmits a signal related to the sensed temperature to the controller 310. Here, the temperature sensor unit 320 may sense a refrigerating compartment temperature and a freezing compartment temperature respectively. In addition, the temperature sensor unit 320 may sense a temperature of each chamber within the refrigerating compartment or a temperature of each chamber within the freezing compartment.

The controller 310 may control the compressor drive unit 113 and the fan drive unit 117 or 145 as exemplarily shown in the drawing to control turn-on/turn-off of the compressor 112 and the fan 115 or 144, thereby finally controlling the compressor 112 and the fan 115 or 144. Here, the fan drive unit may be the machine room fan drive unit 117 or the freezing compartment fan drive unit 145.

For example, the controller 310 includes a microcomputer and may output a speed command signal corresponding to the compressor drive unit 113 or the fan drive unit 117 or 145.

The compressor drive unit 113 and the freezing compartment fan drive unit 145 as described above respectively include a compressor motor (not shown) and a freezing compartment fan motor (not shown), and these motors (not shown) may be operated respectively at target rotation speeds under control of the controller 310.

The machine room fan drive unit 117 may include a machine room fan motor (not shown), and the machine room fan motor (not shown) may be operated at a target rotation speed under control of the controller 310.

In the case in which the aforementioned motors are three-phase motors, the motors may be controlled by switching operation in an inverter (not shown), or may be controlled to operate at a constant speed using an alternating current (AC) voltage. Here, the respective motors (not shown) may be any one of an induction motor, a brushless direct current (BLDC) motor, a synchronous reluctance (synRM) motor, and the like.

Meanwhile, the controller 310, as described above, may control general operations of the refrigerator 1, in addition to controlling operations of the compressor 112 and the fan 115 or 144.

That is, the controller 310 may control operation of a refrigerant cycle according to the set temperature from the input unit 220. For example, the controller 310 may further control the freezing compartment expansion valve 134, the compressor drive unit 113, the freezing compartment fan drive unit 145 and the machine room fan drive unit 117. In addition, the controller may further control operation of the condenser 116. In addition, the controller 310 may control operation of the display 230.

The defroster 330 operates in order to remove frost from the evaporator 124. The defroster 330 may operate under control of the defroster drive unit 331.

In particular, the defroster 330 operates according to the amount of frost attached around the evaporator 124, which is sensed by the frost sensor unit 500.

Meanwhile, in association with the embodiment of the present invention, the frost sensor unit 500 senses the amount of frost attached to the evaporator 124. In addition, the heater 510 operates to remove frost sensed by the frost sensor unit 500.

The heater 510 operates by the heater drive unit 332 and the controller 310 may control the heater drive unit 332 to operate the heater 510 at a predetermined heating period or based on the amount of frost sensed by the frost sensor unit 500.

Figure 4:
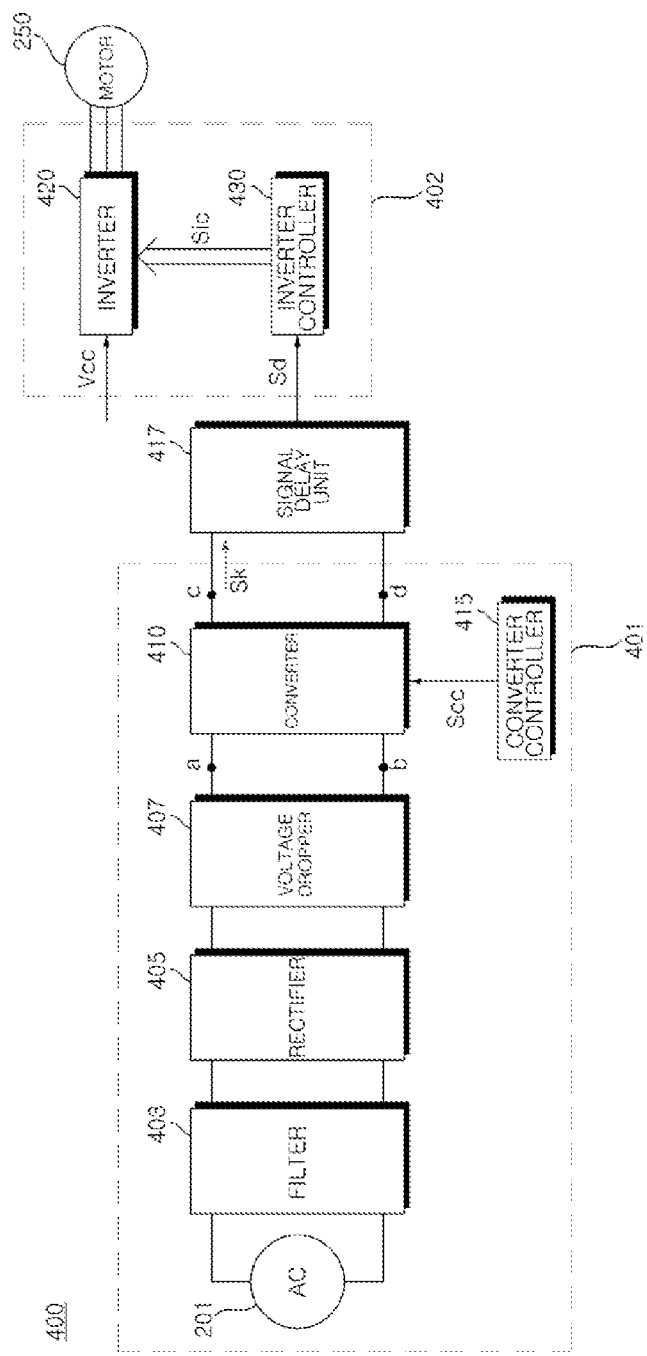
FIG. 4 is a block diagram showing the internal configuration of a motor driving apparatus according to an embodiment of the present invention.
Figure 5:
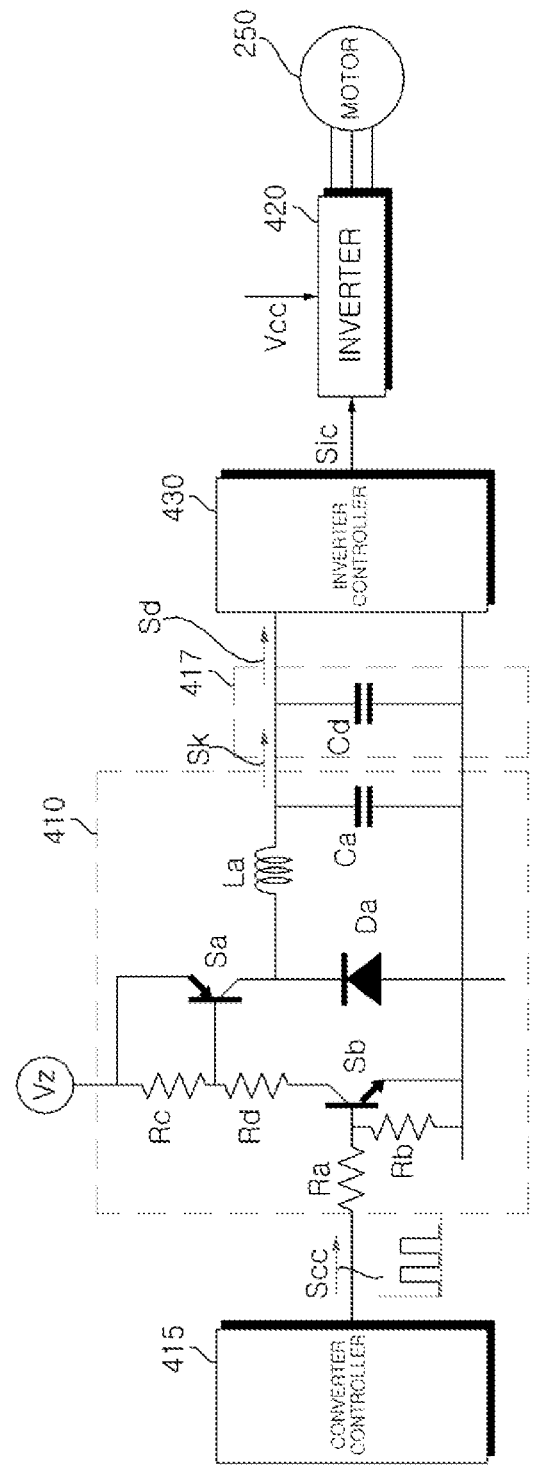
FIG. 5 is a circuit diagram showing a converter in the motor driving apparatus of FIG. 4.

FIG. 4 is a block diagram showing the internal configuration of a motor driving apparatus according to an embodiment of the present invention, and FIG. 5 is a circuit diagram showing a converter in the motor driving apparatus of FIG. 4.

The motor driving apparatus 400 according to the embodiment of the present invention may be a fan motor driving apparatus for driving at least one of the machine room fan 115, the freezing compartment fan 144 or the refrigerating compartment fan (not shown) of FIG. 3.

The motor driving apparatus 400 according to the embodiment of the present invention may include a filter 403, a rectifier 405, a voltage dropper 407, a converter 410, a converter controller 415, a signal delay unit 417, an inverter 420 and an inverter controller 430.

The filter 403, the rectifier 405, the voltage dropper 407, the converter 410 and the converter controller 415 are mounted on a first circuit board 401 and the inverter 420 and the inverter controller 430 may be mounted on a second circuit board 402. The signal delay unit 410 may be mounted on any one of the first circuit board 401 or the second circuit board 402.

The filter 403 may be located between an input alternating current (AC) power source 201 and the rectifier 405 and may filter harmonic current generated by the input AC power source 201 or the motor driving apparatus 400. To this end, the filter 403 may include an inductor which is an inductive element and a capacitor which is a capacitive element. For example, the filter 403 may include an LCL filter including an inductor, a capacitor and an inductor.

The rectifier 405 receives and rectifies an input AC voltage 201 passing through the filter 403. Although a bridge of four diodes Da, Db, Dc and Dd are used as the rectifier 405 for a single-phase AC voltage in FIG. 4, various other examples are possible.

The voltage dropper 407 drops the rectified voltage from the rectifier 405 and outputs a DC voltage, the level of which has changed. For example, when rectified voltage is about 300V, the voltage dropper may change that voltage to a DC voltage of about 12V and output the changed voltage.

The voltage dropper 420 may include a switched-mode power supply (SMPS).

Next, the converter 410 may output a pulse amplitude modulation (PAM)-based signal $S_A$ using a DC voltage from the voltage dropper 420 and a pulse width modulation (PWM)-based converter control signal Scc received from the converter controller 415.

Here, the PWM-based converter control signal Scc received from the converter controller 415 may be a speed command signal for driving the motor 250.

The level of the pulse amplitude modulation (PAM)-based signal $S_A$ output from the converter 410 may be lower than that of the DC voltage from the voltage dropper 420.

Although the converter 410 may be a booster converter, a buck-boost converter or a buck converter, the buck converter will hereinafter be focused upon.

FIG. 5 shows a buck converter. Referring to FIG. 5, the converter 410 operates in response to a switching control signal from the converter controller 415. More specifically, the converter 410 receives, from the converter controller 415, the PWM-based switching control signal Scc as the speed command signal for driving the motor and outputs the PAM-based switching control signal using the PWM signal and an input DC voltage Vz. At this time, the DC voltage Vz may correspond to the output voltage of the voltage dropper 407, that is, a voltage between terminals a and b.

To this end, the converter 410 may include a buck switching element Sa for performing buck switching, an inductor La for storing current flowing by the turn-on operation of the buck switching element and a diode Da connected in parallel between the buck switching element and the inductor La.

The converter 410 may include a switching element Sb operating for switching control of the buck switching element Sa, resistors Ra, Rb, Rc and Rd for voltage division and a capacitor Ca connected to the output terminal of the inductor La.

In operation of FIG. 5, when the converter 410 receives the PWM-based switching control signal Scc from the converter controller 415 as the speed command signal for driving the motor, the switching control signal, which is voltage-divided based on the resistors Ra and Rb for voltage division, is input to the switching element Sb and the switching element Sb performs turn-on/turn-off operation.

In particular, when the switching element Sb is turned on, current generated by the DC voltage Vz input to the converter 410 flows in the resistors Rc and Rd for voltage division. By the voltages divided by the resistors Rc and Rd, the buck switching element Sa performs turn-on/turn-off operation.

By turn-on operation of the buck switching element Sa, current generated by the DC voltage Vz input to the converter 410 flows through the buck switching element Sa and the inductor La. At this time, the diode Da does not conduct and energy generated by current flowing in the inductor La is accumulated in the inductor La.

By the turn-off operation of the buck switching element Sa, current generated by the DC voltage Vz input to the converter 410 does not flow through the buck switching element Sa and, instead, the diode Da conducts by energy stored in the inductor La and current flows through the diode Da and the inductor La.

As the pulse width of the received PWM-based switching control signal Scc increases, the turn-on timing of the buck switching element Sa increases and thus current flowing through the inductor La increases. As the pulse width of the received PWM-based switching control signal Scc decreases, the turn-on timing of the buck switching element Sa increases and thus current flowing through the inductor La decreases.

As a result, the buck converter 410 may convert the PWM-based switching control signal Scc into the PAM-based signal Sk and output the PAM-based signal Sk, by the turn-on/turn-off operation of the buck switching element Sa.

The converter controller 415 may generate the speed command for driving the motor 250 at a predetermined speed. To this end, the converter controller 415 may receive a current speed value of the motor 250. For example, the current speed value of the motor may be received from the inverter controller 430.

Meanwhile, the converter controller 415 may control overall operation of the refrigerator. For example, the converter controller 415 may be included in the controller 310 of FIG. 3 or may be the controller 310 of FIG. 3.

The signal delay unit 417 may receive and delay the PAM-based signal Sk output from the converter 410 by a predetermined time and output the delayed signal Sd.

For example, the signal delay unit 417 may be implemented by a switching element, a capacitor, etc. In FIG. 5, the signal delay unit 417 includes a capacitor Cd. Upon initial start-up of the motor driving apparatus 200, the capacitor Cd may perform delay operation. That is, upon initial start-up, when the PAM-based signal Sk is sequentially input, the capacitor Cd performs only sequential charging operation by the level of the signal Sk but does not perform discharging operation. The level of the voltage charged in the capacitor Cd increases due to delay by the predetermined time. When the level of the voltage by charging is equal to or greater than a predetermined value, the discharging operation is performed and the signal Sd delayed by the predetermined time is output.

As a result, upon initial start-up of the motor driving apparatus 200, by the capacitor Cd, the PAM-based signal Sk may be delayed by the predetermined time and the delayed signal Sd may be input to the inverter controller 430.

By operation of the signal delay unit 417, since the delayed signal Sd is input to the inverter controller 430, start-up failure may be prevented and noise may be reduced upon initial start-up. Operation of the signal delay unit 417 will be described in greater detail with reference to FIGS. 8 and 9.

The inverter 420 includes a plurality of inverter switching elements and may convert the DC voltage Vdc smoothed by the on/off operation of the switching element into a three-phase AC voltage having a predetermined frequency and output the three-phase AC voltage to the three-phase synchronization motor 250. At this time, the motor 250 may be a motor in the compressor.

The switching element used in the inverter 420 may include a metal oxide semiconductor field effect transistor (MOSFET) having a fast operation speed and excellent per conversion efficiency.

The inverter controller 430 outputs an inverter switching control signal Sic to the inverter 420 in order to control the switching operation of the inverter 420. The inverter switching control signal Sic is a PWM-based switching control signal and may be generated and output based on counter electromotive force $V_{BE}$ detected by a counter electromotive force detector (G of FIG. 6) for counter electromotive force generated from the motor 250 or an output current value $i_o$ detected by an output current detector (E of FIG. 10).

Figure 6:
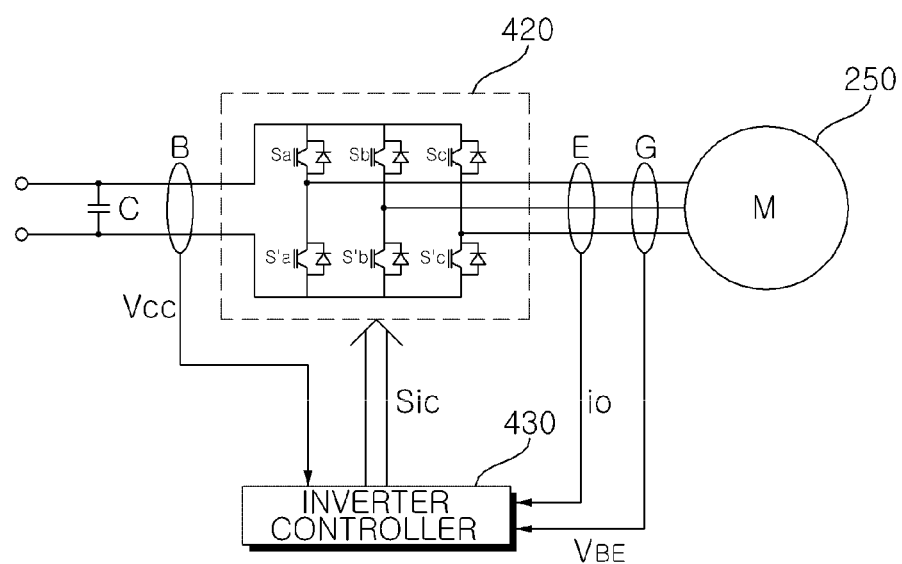
FIG. 6 is a circuit diagram of an inverter of FIG. 4.
Figure 7:
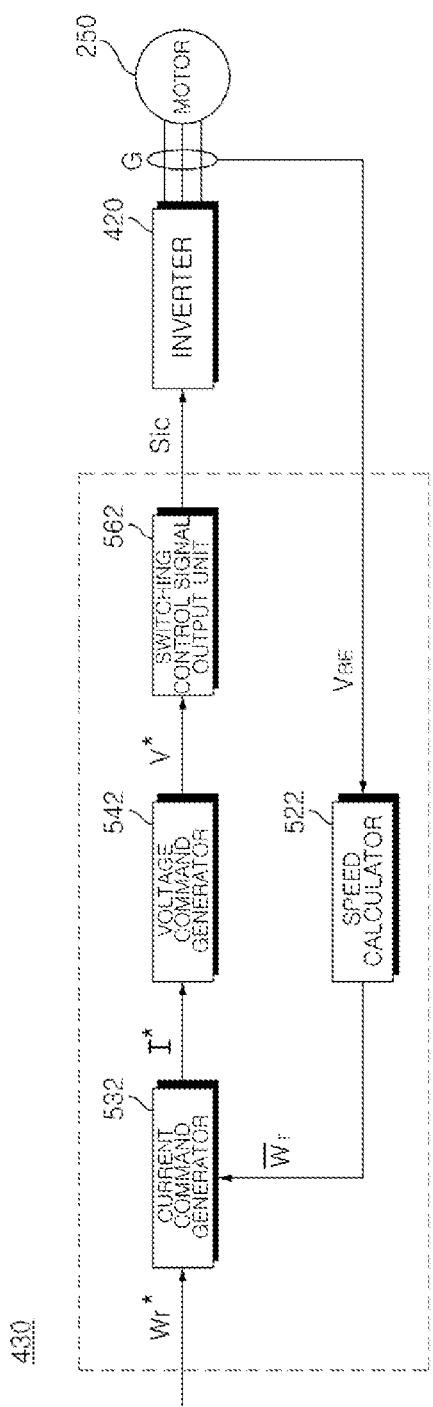
FIG. 7 is a block diagram showing the internal configuration of an inverter controller of FIG. 4.
Figure 10:
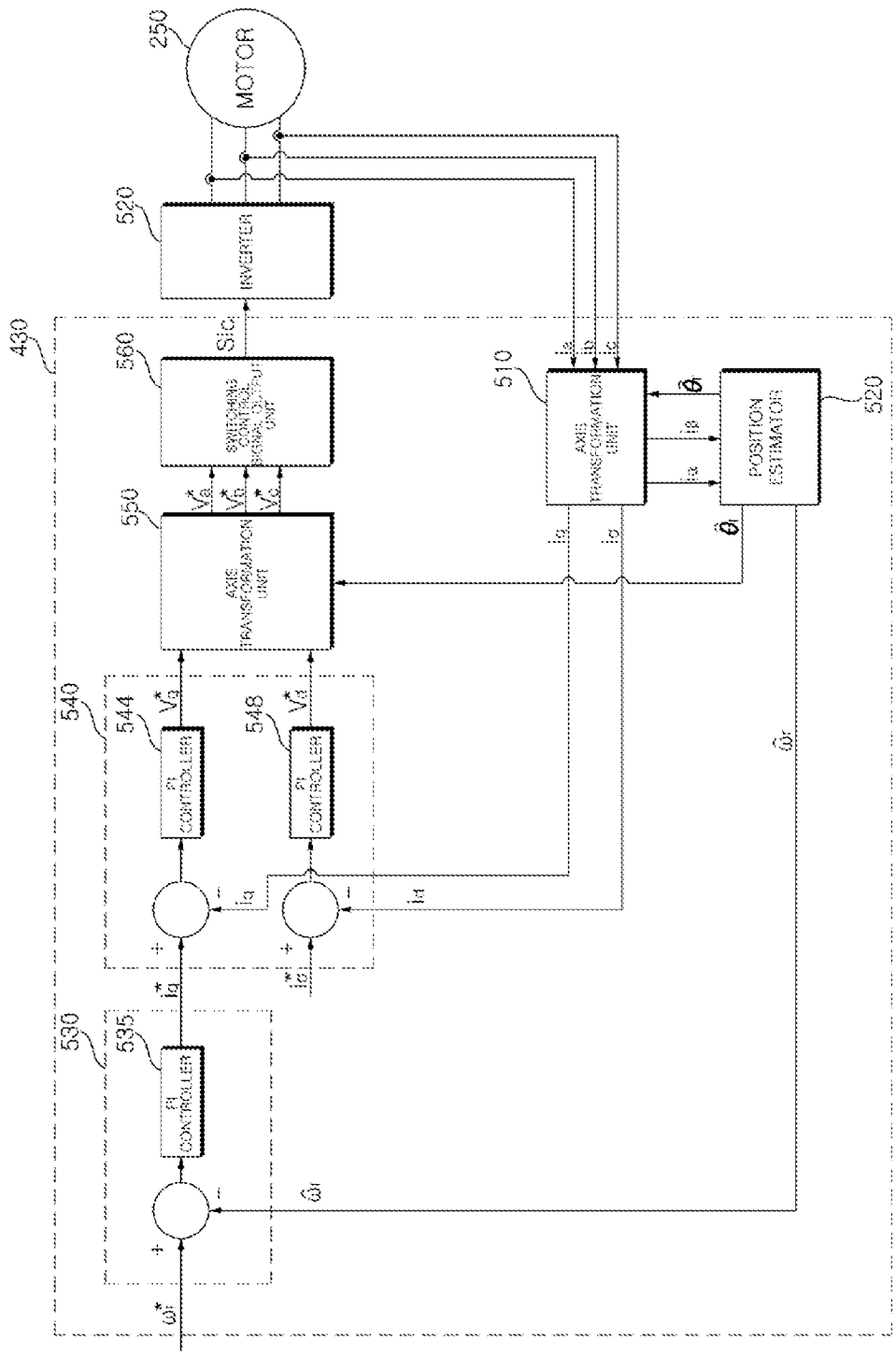
FIG. 10 is a block diagram showing another example of the internal configuration of the inverter controller of FIG. 4.

FIGS. 6 and 7 show an inverter control method using counter electromotive force and FIG. 10 shows an inverter control method using output current.

FIG. 6 is a circuit diagram showing the inverter of FIG. 4.

In the inverter 420, upper-arm switching elements Sa, Sb and Sc connected in series and lower-arm switching elements S'a, S'b and S'c form respective pairs and a total of three pairs of upper-arm and lower-arm switching elements Sa & S'a, Sb & S'b and Sc & S'c are connected in parallel. Diodes are connected to the switching elements, Sa, S'a, Sb, S'b, Sc and S'c in anti-parallel.

The switching elements in the inverter 420 perform on/off operation based on the inverter switching control signal Sic from the controller 430.

The inverter 420 converts the DC voltage Vcc across the capacitor C into an AC voltage to drive the motor 250 in the operation mode of the motor 250.

The inverter controller 430 may control operation of the switching elements in the inverter 420. To this end, the inverter controller 430 may receive the counter electromotive force $V_{BE}$ detected by the counter electromotive force detector G.

The inverter controller 430 outputs the inverter switching control signal Sic to the inverter 420 in order to control the switching operation of the inverter 420. The inverter switching control signal Sic is a PWM-based switching control signal and is generated and output based on the counter electromotive force $V_{BE}$ detected by the counter electromotive force detector G.

The counter electromotive detector G detects counter electromotive force generated in any one of the three phases of the motor 250. More specifically, counter electromotive force generated in one phase having a voltage value of 0 V among the three phases of the motor 250 is detected. To this end, the motor 250 may be driven such that conduction is not performed during some periods in one phase of the three phases. For example, the motor may be driven by a 120-degree conduction method or a 150-degree conduction method.

The counter electromotive force detector G may be located between the inverter 420 and the motor 250 and detect the counter electromotive force $V_{BE}$ generated in a non-conduction period of the motor 250. In particular, the counter electromotive force detector G may sequentially detect the counter electromotive force $V_{BE}$ generated in each phase.

The counter electromotive force detector G may be located between the inverter 420 and the motor 250 and may include a resistor, an amplifier, etc., for counter electromotive force $V_{BE}$. The detected counter electromotive force $V_{BE}$ is a discrete signal having a pulse shape and may be applied to the inverter controller 430. The inverter switching control signal Sic may be generated based on the detected counter electromotive force $V_{BE}$.

FIG. 7 is a block diagram showing the internal configuration of the inverter controller of FIG. 4.

Referring to FIG. 7, the inverter controller 430 may generate and output the inverter switching control signal Sic based on the detected counter electromotive force.

To this end, the inverter controller 430 may include a speed calculator 522, a current command generator 532, a voltage command generator 542 and a switching control signal output unit 562.

The speed calculator 522 may calculate the rotation speed $\hat{\omega}_r$ of the motor 250 based on the counter electromotive force $V_{BE}$ detected by the counter electromotive detector G. When the mechanical equation and the electrical equation of the motor 250 are used, the speed may be calculated from the detected counter electromotive force $V_{BE}$.

The current command generator 532 generates a current command I* based on the calculated speed $\hat{\omega}_r$ and a speed command $\omega^*r$ input to the inverter controller 430. Here, the speed command $\omega^*_r$ may be the signal Sd of FIG. 5, that is, the PAM-based signal delayed by the predetermined time.

Next, the voltage command generator 542 generates a voltage command V* based on the current command I* from the current command generator 532. At this time, the voltage command V* may be a voltage command signal for three phases.

The switching control signal output unit 562 generates and outputs the PWM-based inverter switching control signal Sic based on the voltage command V*.

The output inverter switching control signal Sic may be converted into a gate driving signal by a gate drive unit (not shown) and input to the gate of each switching element in the inverter 420. Thus, the switching elements Sa, S'a, Sb, S'b, Sc and S'c in the inverter 420 perform switching operation.

Figure 8:
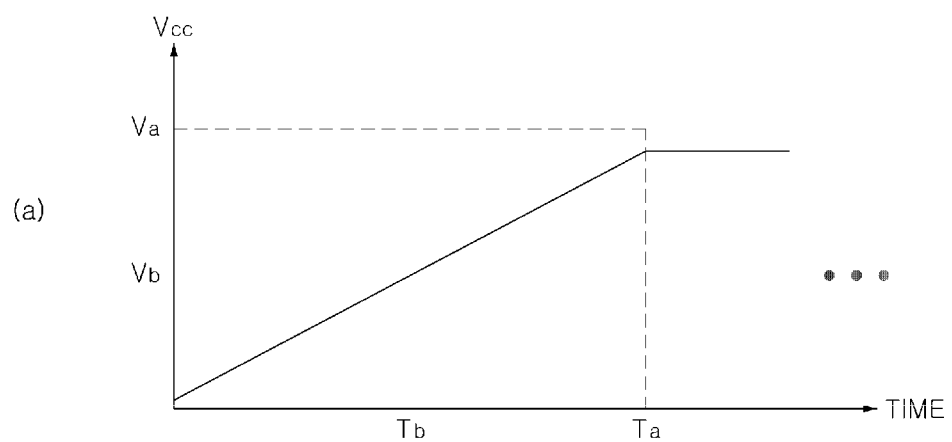
FIGS. 8 to 9 are views referred to for describing operation of the motor driving apparatus of FIG. 4.
Figure 8:
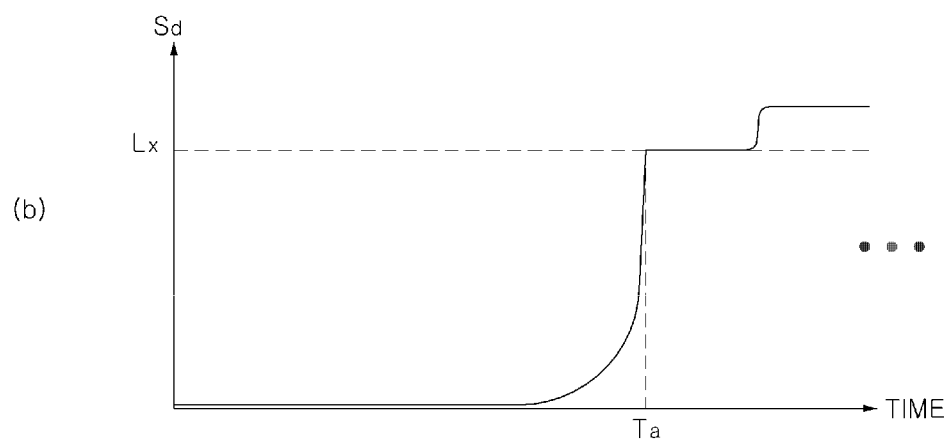
Figure 9:
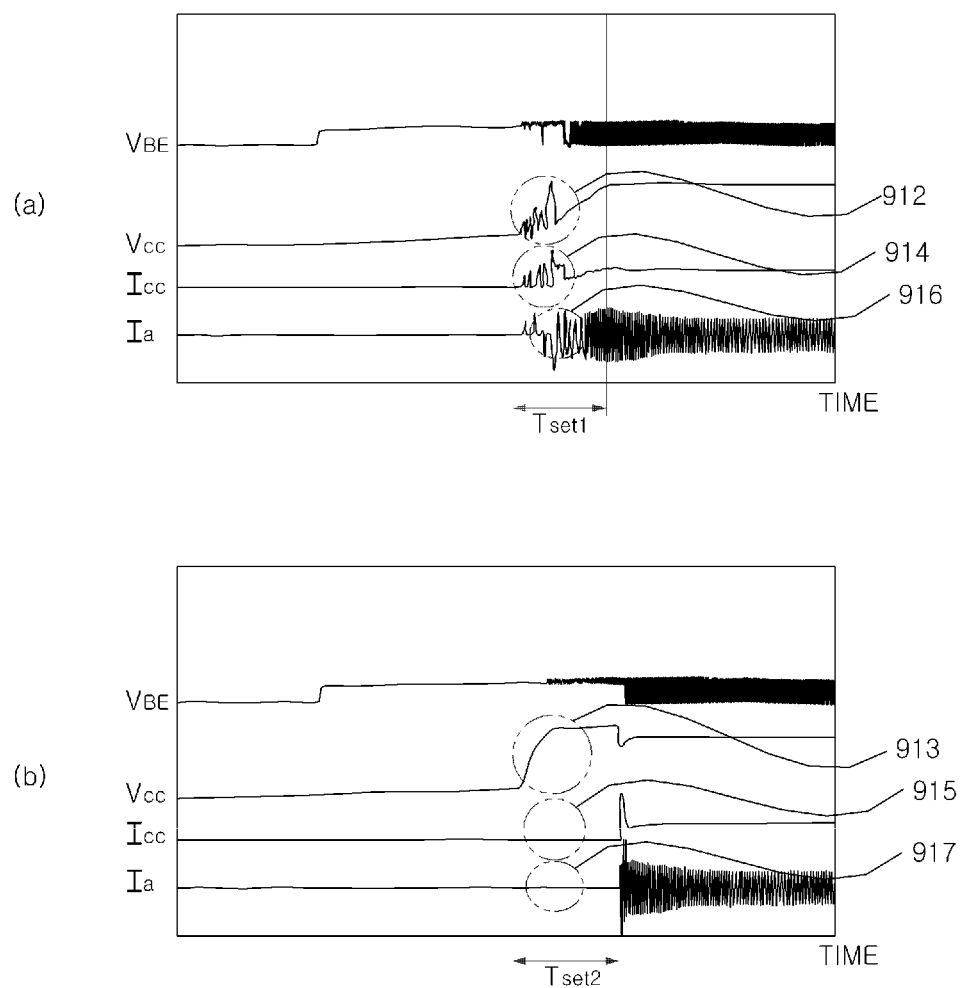

FIGS. 8 to 9 are views referred to for describing operation of the motor driving apparatus of FIG. 4.

FIG. 8(a) shows an operating DC voltage Vcc input to the inverter 420 upon initial start-up of the motor driving apparatus 200. Upon initial start-up of the motor driving apparatus 200, the operating DC voltage Vcc input to the inverter 420 may sequentially increase. This may be referred to as soft start.

The operating DC voltage Vcc may be an output voltage of the voltage dropper 407, that is, a voltage between terminals a and b.

Referring to FIG. 8(a), upon initial start-up of the motor driving apparatus 200, the operating DC voltage VCC sequentially increases until reaching a voltage Va. Meanwhile, when the operating DC voltage Vcc is less than a voltage Vb, a low-voltage limiter (not shown) having an undervoltage-lockout (UVLO) function may operate such that operation of the switching elements in the inverter 420 stop. Such a low-voltage limiter may be included in the inverter 420 or the inverter controller 425. The voltage Va may be about 12 V and the voltage Vb may be about 4.5 V.

Meanwhile, in a state in which the operating DC voltage Vcc input to the inverter 420 sequentially increases, when the signal delay unit 417 of FIG. 4 is not used and the PAM-based speed command signal Sk is immediately input to the inverter controller 430, the following problems may occur.

For example, when the PAM-based speed command signal is input to the inverter controller 430, the inverter switching control signal Sic may be output to the gate terminal of the inverter 420 based on the PAM-based speed command signal. In a state in which the level of the operating DC voltage Vcc has a value between the voltage Va and the voltage Vb, when the PAM-based speed command signal Sk having an unstable level, such as noise, is input to the inverter controller 430 such that the inverter switching control signal Sic including a noise component is output to the gate terminal of the inverter 420, the switching elements in the inverter 420 may malfunction to perform turn-on operation due to a difference between the level of the inverter switching control signal Sic and the sequentially increasing operating DC voltage Vcc.

As another example, in a state in which the level of the operating DC voltage Vcc has a value equal to or less than the voltage Vb to be limited by the low-voltage limiter, when the PAM-based speed command signal Sk having an unstable level, such as noise, is input to the inverter controller 430, the inverter switching control signal Sic may be output due to a noise component and the switching elements in the inverter 420 may malfunction to perform turn-on operation due to a difference between the level of the inverter switching control signal Sic and the sequentially increasing operating DC voltage Vcc.

In this case, due to the insufficient level of the operating DC voltage Vcc, the output current io flowing in the motor 250 becomes unstable through the inverter 420.

As shown in FIG. 9(a), a period 916 in which phase current Ia becomes unstable may occur in the start-up period Tset1 of the motor. The unstable period may be referred to as a ringing period. Due to such an unstable period, the motor 250 rotates, thereby generating noise.

In addition, in correspondence with an unstable period 926 of the phase current, the unstable period 912 of the operating DC voltage Vcc input to the inverter 420 and an unstable period 914 of the operating DC current Icc input to the inverter 420 also occur and the counter electromotive force $V_{BE}$ measured in the motor 150 becomes unstable as shown in FIG. 9(a).

Meanwhile, the unstable period 916 of the phase current of FIG. 9(a) may occur even when noise is added to the operating DC voltage Vcc input to the inverter 420 in addition to upon initial start-up of the motor driving apparatus 200, that is, upon soft start.

In the embodiment of the present invention, upon soft start or upon adding noise, in order to prevent malfunction of the inverter 420, as described above, the signal delay unit 417 is used.

The signal delay unit 417 may delay the received PAM-based signal by a predetermined time. To this end, as described above, the capacitor Cd, etc. may be used. An RC time constant value which is a time delay value based on the capacitor Cd may correspond to a time Ta of FIG. 8(a) which is a soft start period. The time Ta, that is, the soft start period, is about 2 seconds and thus the RC time constant may be about 2 seconds.

As a result, the capacitance of the capacitor Cd may be determined in correspondence with the time Ta of FIG. 8(a) which is the soft start period. For example, the capacitance of the capacitor Cd may be about 22 μF.

FIG. 8(b) is a timing diagram of the delayed PAM-based speed command signal Sd obtained by delaying the PAM-based speed command signal Sk via the signal delay unit 417. By the speed delay value based on the capacitance of the signal delay unit 417, the signal is approximately delayed by a time Ta and has a level Lx at the time Ta.

When the delayed PAM-based speed command signal Sd is input to the inverter controller 430, the inverter controller 430 outputs the switching control signal delayed by the predetermined time and thus the inverter 420 stably operates after the motor start-up period. That is, as shown in FIG. 9(b), a stable period 917 in which the phase current Ia becomes stable may occur in the start-up period Tset2 of the motor.

That is, unlike FIG. 9(a), a ringing period in which the phase current Ia rings does not occur. In the start-up period Tset2 of the motor, the inverter does not operate according to the delayed speed command signal Sd and thus the phase current flowing in the motor has a value of 0.

Meanwhile, in correspondence with the stable period 917 of the phase current of FIG. 9(b), a stable period 913 of the operating DC voltage Vcc input to the inverter 420 and a stable period 915 of the operating DC current IC input to the inverter 420 also occur.

Therefore, it is possible to prevent start-up failure and reduce noise upon initial start-up.

FIG. 10 is a block diagram showing another example of the internal configuration of the inverter controller of FIG. 4.

Referring to FIG. 10, the inverter controller 430 may generate and output the inverter switching control signal Sic based on the output current flowing in the motor.

To this end, the inverter controller 430 may include an axis transformation unit 510, a position estimator 520, a current command generator 530, a voltage command generator 540, an axis transformation unit 550 and a switching control signal output unit 560.

The axis transformation unit 510 receives and transforms three-phase output currents ia, ib and is detected by the output current detector E into two-phase currents iα and iβ of a stationary coordinate system.

The axis transformation unit 510 may transform the two-phase currents iα and iβ of the stationary coordinate system into two-phase currents id and Iq of the rotating coordinate system.

The position estimator 520 may calculate the speed $\hat{\omega}_r$ based on the position signal H of a rotator received from the position detector 235. That is, when the position signal is divided by time, the speed may be calculated.

Meanwhile, the position detector 235 may detect the position of the rotator of the motor 250. To this end, the position detector 235 may include a Hall sensor.

Meanwhile, the position estimator 520 may output the calculated position $\hat{\theta}_r$ and the calculated speed $\hat{\omega}_r$ based on the received position signal H of the rotator.

The current command generator 530 generates a current command $i^*_q$ based on the calculated speed $\hat{\omega}_r$ and the speed command $\omega^*_r$ input to the inverter controller 430. Here, the speed command $\omega^*_r$ may be the signal Sd of FIG. 5, that is, the PAM-based signal delayed by the predetermined time.

For example, the current command generator 530 may perform PI control in the PI controller 535 based on the difference between the calculated speed $\hat{\omega}_r$ and the speed command $\omega^*_r$ and generate the current command $i^*_q$. Although a q-axis current command $i^*_q$ is shown as the current command in the drawing, unlike the drawing, a d-axis current command $i^*_d$ may also be generated. The value of the d-axis current command $i^*_d$ may be set to 0.

The current command generator 530 may further include a limiter (not shown) for limiting the level of the current command $i^*_q$ so as not to exceed an allowable range.

Next, the voltage command generator 540 generates d-axis and q-axis voltage commands $v^*_d$ and $v^*_q$ based on d-axis and q-axis currents $i_d$ and $i_q$ transformed into the two-phase rotating coordinate system by the axis transformation unit and the current commands $i^*_d$ and $i^*_q$ generated by the current command generator 530. For example, the voltage command generator 540 may perform PI control in the PI controller 544 based on the difference between the q-axis current $i_q$ and the q-axis current command $i^*_q$ and generate the q-axis voltage command $v^*_q$. In addition, the voltage command generator 540 may perform PI control in the PI controller 548 based on the difference between the d-axis current $i_d$ and the d-axis current command $i^*_d$ and generate the d-axis voltage command $v^*_d$. Meanwhile, the value of the d-axis voltage command $v^*_d$ may be set to 0 in correspondence with the value of the d-axis current command $i^*_d$ set to 0.

The voltage command generator 540 may further include a limiter (not shown) for limiting the level of the d-axis and q-axis voltage commands $v^*_d$ and $v^*_q$ so as not to exceed an allowable range.

The generated d-axis and q-axis voltage commands $v^*_d$ and $v^*_q$ are input to the axis transformation unit 550.

The axis transformation unit 550 receives the position $\hat{\theta}_r$ calculated by the position estimator 520 and the d-axis and q-axis voltage commands $v^*_d$ and $v^*_q$ and performs axis transformation.

First, the axis transformation unit 550 transforms the two-phase rotating coordinate system into the two-phase stationary coordinate system. At this time, the position $\hat{\theta}_r$ calculated by the position estimator 520 may be used.

Then, the axis transformation unit 550 transforms the two-phase stationary coordinate system into the three-phase stationary coordinate system. Via such transformation, the axis transformation unit 1050 outputs three-phase output voltage commands v*a, v*b and v*c.

The switching control signal output unit 560 generates and outputs the PWM-based inverter switching control signal Sic based on the three-phase output voltage commands v*a, v*b and v*c.

The output inverter switching control signal Sic may be converted into the gate driving signal in the gate drive unit (not shown) and input to the gate of each switching element in the inverter 420. Thus, the switching elements Sa, S'a, Sb, S'b, Sc and S'c in the inverter 420 perform switching operation.

The motor driving apparatus and the refrigerator including the same according to the foregoing embodiments are not restricted to the configuration and method of the embodiments set forth herein. Therefore, some or all of the above-described embodiments may be selectively combined to make various modifications.

The method of operating the motor driving apparatus and the refrigerator according to the foregoing embodiments may be implemented as code that can be written to a processor-readable recording medium included in the motor driving apparatus or the refrigerator and can thus be read by a processor. The processor-readable recording medium may be any type of recording device in which data can be stored in a processor-readable manner. Examples of the processor-readable recording medium include a ROM, a RAM, a CD-ROM, a magnetic tape, a floppy disk, optical data storage, and a carrier wave (e.g., data transmission over the Internet). The processor-readable recording medium may be distributed over a plurality of computer systems connected to a network so that processor-readable code is written thereto and executed therefrom in a decentralized manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

The invention claimed is:

1. A motor driving apparatus comprising
a signal delay unit configured to delay an input speed command signal;
an inverter controller configured to output an inverter switching control signal based on the input speed command signal delayed by the signal delay unit; and
an inverter configured to convert an input operating direct current (DC) voltage into a predetermined alternating current (AC) voltage and driving a motor by the converted AC voltage, based on switching operation according to the inverter switching control signal,
wherein the signal delay unit includes a capacitor, and capacitance of the capacitor corresponds to a soft tart period upon initial start-up of the motor driving apparatus.

2. The motor driving apparatus according to claim 1, wherein:
the signal delay unit delays the input speed command signal by a predetermined time in an initial start-up period of the motor driving apparatus, and
the delay time corresponds to a period until the operating DC voltage input to the inverter reaches a predetermined voltage.

3. The motor driving apparatus according to claim 1, further comprising:
a converter controller configured to output a pulse width modulation (PWM)-based speed command signal; and
a converter configured to convert the PWM-based speed command signal into a pulse amplitude modulation (PAM)-based speed command signal and output the PAM-based speed command signal,
wherein the signal delay unit receives the PAM-based speed command signal.

4. The motor driving apparatus according to claim 3, wherein the converter includes:
a buck switching element;
an inductor configured to store flowing current by turn-on operation of the buck switching element; and
a diode connected between the buck switching element and the inductor in parallel,
wherein the buck switching element is switched to output the PAM-based speed command signal, based on the PWM-based the speed command signal.

5. The motor driving apparatus according to claim 3, further comprising:
a rectifier configured to rectify an input AC voltage; and
a voltage dropper configured to drop the rectified voltage and output a DC voltage, the level of which has changed,
wherein the DC voltage input to the converter and the inverter corresponds to the output voltage of the voltage dropper.

6. The method according to claim 1, further comprising a counter electromotive force detector configured to detect counter electromotive force generated in any one of three phases of the motor,
wherein the inverter controller includes:
a speed calculator configured to calculate a rotation speed of the motor based on the detected counter electromotive force;
a current command generator configured to generate a current command based on the calculated speed and the delayed speed command signal;
a voltage command generator configured to generate a voltage command based on the generated current command; and
a switching control signal output unit configured to output the inverter switching control signal for driving the inverter based on the generated voltage command.

7. The motor driving apparatus according to claim 1, further comprising an output current detector configured to detect output current flowing in the motor,
wherein the inverter controller includes:
a speed calculator configured to calculate rotator speed information of the motor based on the detected output current;
a current command generator configured to generate the current command based on the calculated speed information and the delayed speed command signal;
a voltage command generator configured to generate a voltage command based on the current command and the detected output current; and
a switching control signal output unit configured to output a switching control signal for driving the inverter based on the voltage command.

8. The motor driving apparatus according to claim 1, further comprising:
a rectifier configured to rectify an input AC voltage; and
a voltage dropper configured to drop the rectified voltage and output a DC voltage, the level of which has changed,
wherein the operating DC voltage input to the inverter corresponds to the output voltage of the voltage dropper.

9. A refrigerator comprising:
a compressor;
an evaporator configured to perform heat exchange using a refrigerant compressed by the compressor;
a fan configured to deliver air subjected to heat exchange by the evaporator into the refrigerator; and
a fan drive unit configured to drive the fan,
wherein the fan drive unit includes:
a signal delay unit configured to delay an input speed command signal;
an inverter controller configured to output an inverter switching control signal based on the input speed command signal delayed by the signal delay unit; and
an inverter configured to convert an input operating direct current (DC) voltage into a predetermined alternating current (AC) voltage and driving a motor by the converted AC voltage, based on switching operation according to the inverter switching control signal, wherein the signal delay unit includes a capacitor, and capacitance of the capacitor corresponds to a soft start period upon initial start-up of the motor driving apparatus.

10. The refrigerator according to claim 9, wherein:
the signal delay unit delays the input speed command signal by a predetermined time in an initial start-up period of the motor driving apparatus, and
the delay time corresponds to a period until the operating DC voltage input to the inverter reaches a predetermined voltage.

11. The refrigerator driving apparatus according to claim 9, wherein the fan drive unit further includes:
a converter controller configured to output a pulse width modulation (PWM)-based speed command signal; and
a converter configured to convert the PWM-based speed command signal into a pulse amplitude modulation (PAM)-based speed command signal and output the PAM-based speed command signal,
wherein the signal delay unit receives the PAM-based speed command signal.

12. The refrigerator according to claim 11, wherein the converter includes:
a buck switching element;
an inductor configured to store flowing current by turn-on operation of the buck switching element; and
a diode connected between the buck switching element and the inductor in parallel,
wherein the buck switching element is switched to output the PAM-based speed command signal, based on the PWM-based the speed command signal.

13. The refrigerator according to claim 11, wherein the fan drive unit includes:
a rectifier configured to rectify an input AC voltage; and
a voltage dropper configured to drop the rectified voltage and output a DC voltage, the level of which has changed,
wherein the DC voltage input to the converter and the inverter corresponds to the output voltage of the voltage dropper.

14. The refrigerator according to claim 9, wherein the fan drive unit includes a counter electromotive force detector configured to detect counter electromotive force generated in any one of three phases of the motor, and
wherein the inverter controller includes:
a speed calculator configured to calculate a rotation speed of the motor based on the detected counter electromotive force;
a current command generator configured to generate a current command based on the calculated speed and the delayed speed command signal;
a voltage command generator configured to generate a voltage command based on the generated current command; and
a switching control signal output unit configured to output the inverter switching control signal for driving the inverter based on the generated voltage command.

15. The refrigerator according to claim 9, wherein the fan drive unit further includes an output current detector configured to detect an output current flowing in the motor, and
wherein the inverter controller includes:
a speed calculator configured to calculate rotator speed information of the motor based on the detected output current;
a current command generator configured to generate the current command based on the calculated speed information and the delayed speed command signal;
a voltage command generator configured to generate a voltage command based on the current command and the detected output current; and
a switching control signal output unit configured to output a switching control signal for driving the inverter based on the voltage command.

16. The refrigerator according to claim 9, wherein the fan drive unit includes:
a rectifier configured to rectify an input AC voltage; and
a voltage dropper configured to drop the rectified voltage and output a DC voltage, the level of which has changed,
wherein the operating DC voltage input to the inverter corresponds to the output voltage of the voltage dropper.

* * * * *